United States Patent [19]
Schumacher

[11] Patent Number: 5,339,768
[45] Date of Patent: Aug. 23, 1994

[54] FLOOR WATERING SYSTEM FOR FEEDING WATER TO ANIMALS

[75] Inventor: Egon Schumacher, Barnstorf, Fed. Rep. of Germany

[73] Assignee: Lubing Maschinenfabrik Ludwig Bening GmbH & Co., Barnstorf, Fed. Rep. of Germany

[21] Appl. No.: 14,390

[22] Filed: Feb. 5, 1993

[30] Foreign Application Priority Data

Feb. 8, 1992 [DE] Fed. Rep. of Germany ... 9201575[U]
Jun. 2, 1992 [DE] Fed. Rep. of Germany ... 9207415[U]

[51] Int. Cl.$^5$ .............................................. A01K 39/02
[52] U.S. Cl. ...................................................... 119/72
[58] Field of Search .................................... 119/72, 75

[56] References Cited

U.S. PATENT DOCUMENTS

| | | | |
|---|---|---|---|
| 3,664,305 | 5/1972 | Hart et al. | 119/72 |
| 4,779,571 | 10/1988 | Row | 119/75 |
| 4,884,528 | 12/1989 | Steudler | 119/72.5 |
| 4,892,061 | 1/1990 | Steudler, Jr. | 119/75 |

FOREIGN PATENT DOCUMENTS 3117528 11/1982 Fed. Rep. of Germany .
4130009  3/1992 Fed. Rep. of Germany .

*Primary Examiner*—Robert P. Swiatek
*Attorney, Agent, or Firm*—Deveau, Colton & Marquis

[57] ABSTRACT

Floor-watering systems for feeding water to animals such as poultry have at least one vent (22). This vent (22) has to be closed in order to flush the floor-watering system (10), so that a flushing pressure can build up which is higher than the watering pressure. In prior art floor-watering systems (10), the closure and opening of the vents (22) requires a substantial amount of time and effort. To provide a remedy in this respect, a water supply line (17) of the floor-watering system (10) is associated with at least one shut-off member (27) or the like which is actuable by a movement of the vent (22). As a result, the readily accessible and easily actuable vent (22) forms an actuating member for closing the shut-off member (27) or the like in a simple fashion. Consequently, no tools are required for the closure and opening of the vent (22).

21 Claims, 8 Drawing Sheets

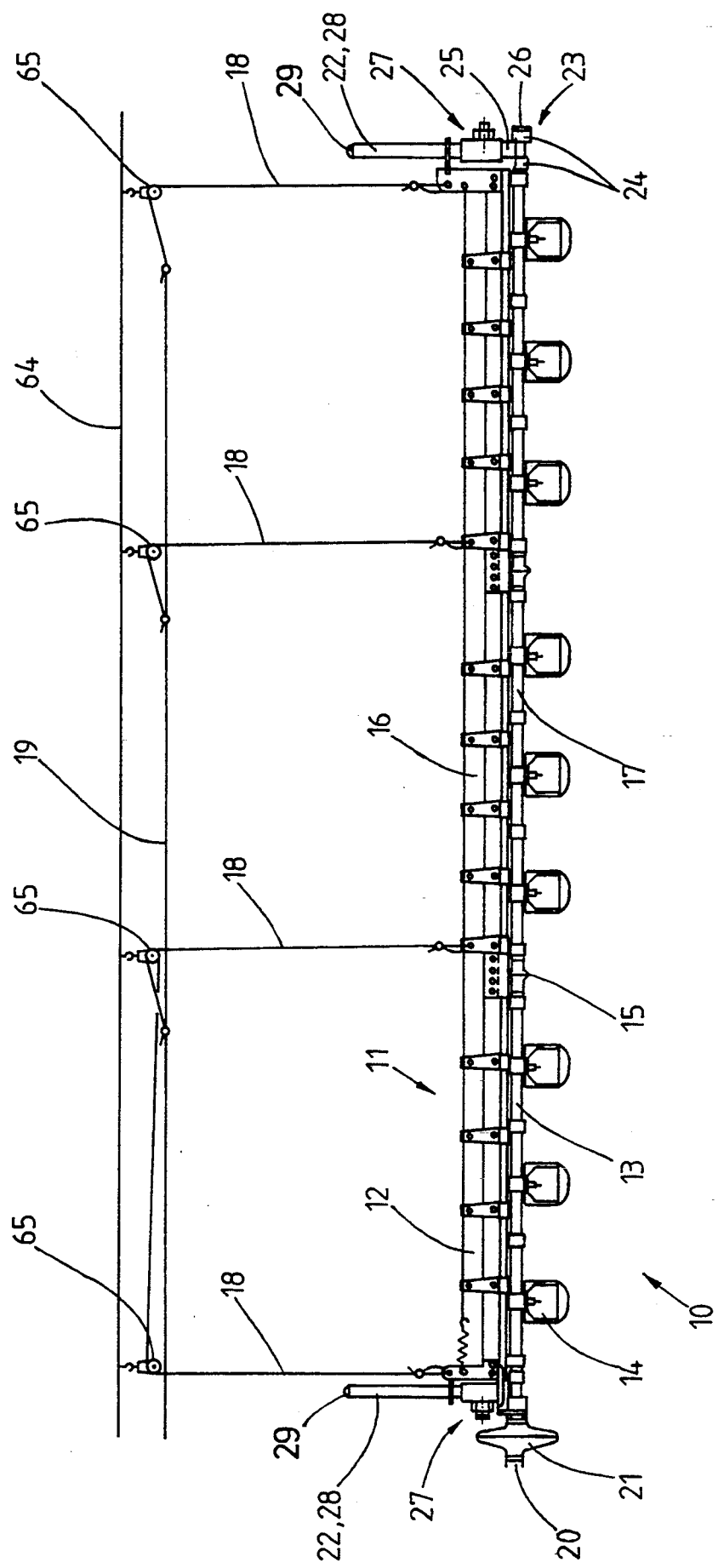

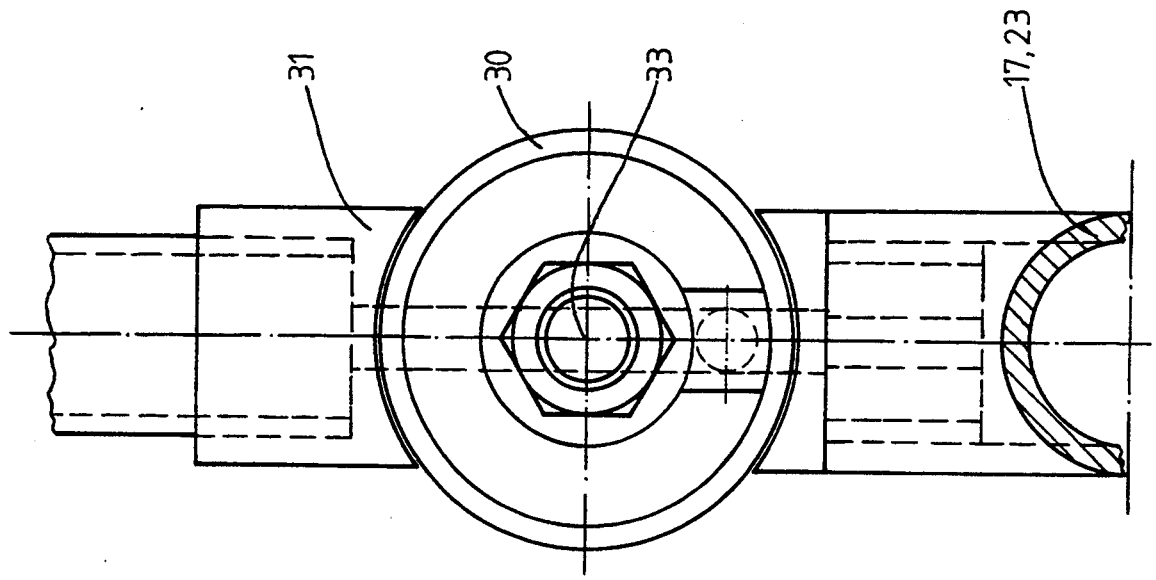
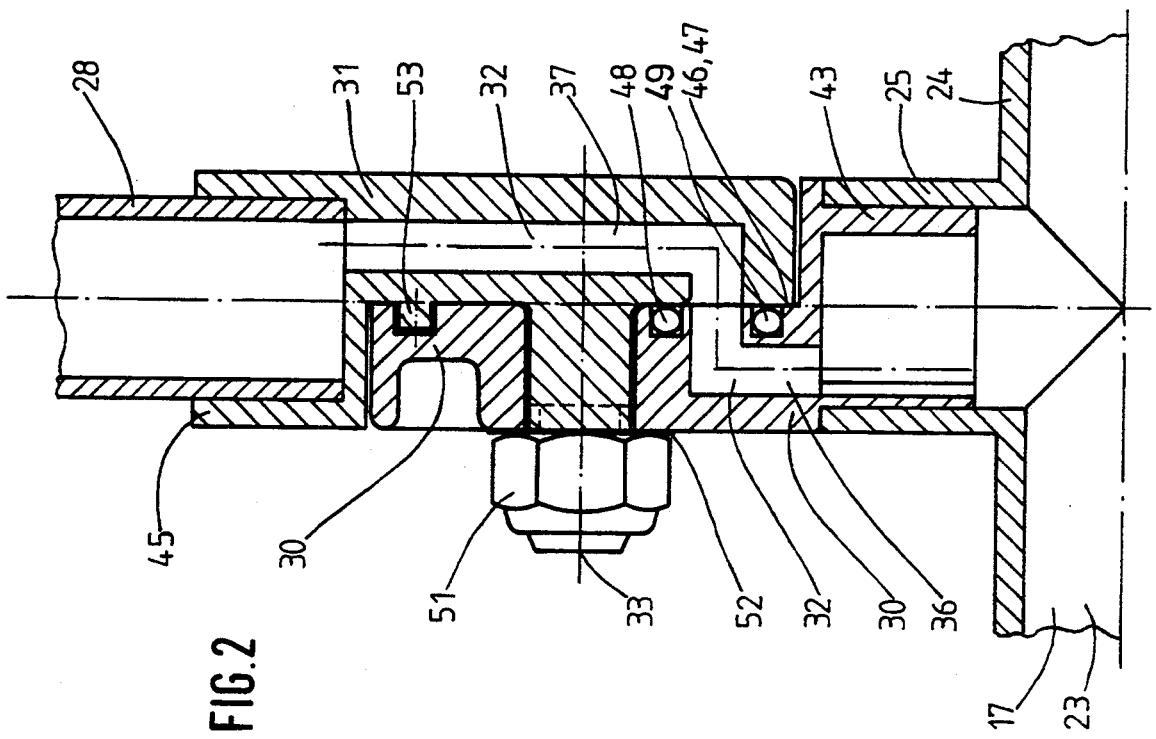

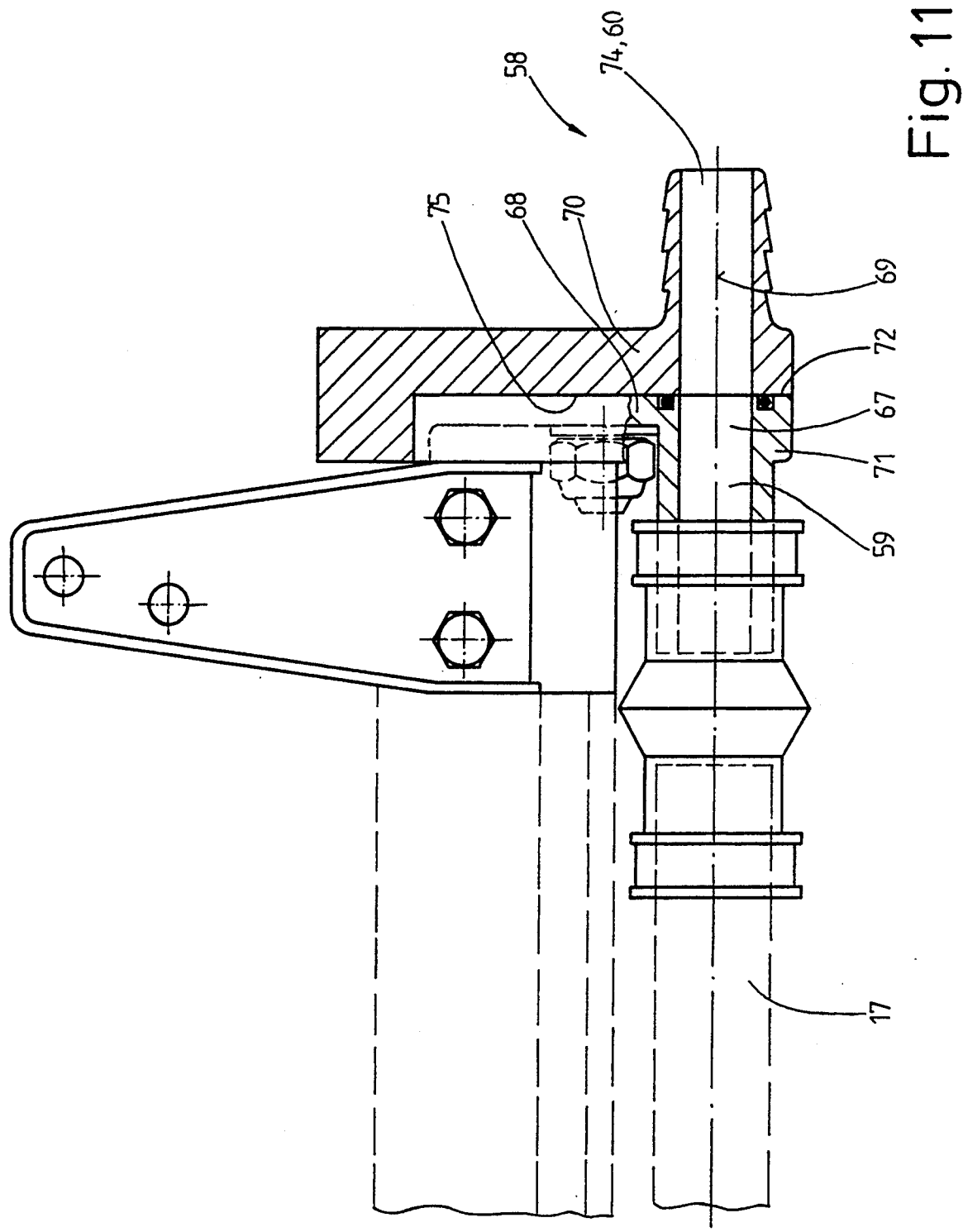

FLOOR WATERING SYSTEM FOR FEEDING WATER TO ANIMALS

BACKGROUND OF THE INVENTION

The invention relates to a floor-watering system for feeding water to animals, especially small animals such as poultry, which has a water supply line which is associated with several drinking points, and at least one vent in the water supply line which has a venting means.

Floor-watering systems of the type described above are flushed at least when a new flock of animals is accommodated in the housing. The flushing water is introduced in one end of the water supply line under pressure and is discharged at the opposite end of the water supply line. For this purpose, vents which are required for the operation of the floor-watering system have to be shut off individually, so that no flushing water can escape through the vents. Shutting off and closing the vents requires a relatively large amount of time.

SUMMARY OF THE INVENTION

The invention is based on the object of creating a floor-watering system of the type described above which can be flushed in an easy and uncomplicated fashion.

The object is attained by assigning a shut-off member and/or a directional control valve to the water supply line which can be actuated by a movement of the venting means. When a new flock of animals is put into the housing, the floor-watering system has to be pulled up and the vents, which preferably comprise an elongated venting means, have to be moved from a preferably vertical position into an approximately horizontal position. In the floor-watering system according to the invention, a simple movement of the venting means opens or closes the shut-off member or the directional control valve. Conventionally, the floor-watering system is pulled up underneath the ceiling of the housing with support wires or ropes. For this purpose, it already used to be necessary to move the elongated venting means from an upright watering position to an approximately horizontal intermediate position. In the floor-watering system according to the invention, this movement can be utilized for closing the vents. As a result, flushing is made substantially less complicated because an additional actuation of the shut-off member or the directional control valve is no longer required.

The shut-off member for closing the vent in the flushing position and for opening the vent in the operating position of the floor-watering system is preferably disposed between the water supply line and the venting means. The shut-off member, which may simply just be 2/2-port directional control valve, thus forms a joint for pivoting the elongated venting means relative to the water supply line.

Expediently, the closing means has two halves which are movable, preferably pivotable relative to one another in such a way that a port for air or water is closed or open. Consequently, the pivoting movement of the venting means from a vertical to a horizontal position, which is required anyway for reducing the height of the floor-watering system in order to arrange the floor-watering system closely underneath the ceiling of the housing, can be used additionally for actuating the shut-off member.

In further accordance with the invention, the water supply line is associated with the directional control valve for closing or opening the vent and/or the water supply line in the flushing or operating position. This in a way direct association of the directional control valve with or in the water supply line thus permits the opening and closure of the water supply line itself as well, and for this purpose the directional control valve is preferably disposed at the beginning or end of the water supply line. Consequently, the water supply line does not require any additional closing elements for closing the line after flushing.

According to a further embodiment of the invention, the directional control valve has two valve connections for the water supply line, one valve connection for venting and an additional valve connection. A bypass serving for bypassing a pressure reducer or similar devices of the water supply line can be connected to the latter valve connection. The directional control valve which thus takes the form of a 4/2-port directional control valve is particularly suitable when several floor-watering systems are to be connected to one another for a common flushing process.

Further features of the invention and their advantages are readily apparent from the following detailed description and the appended dependent claims.

BRIEF DESCRIPTION OF THE DRAWINGS

The invention is described, in detail, hereinafter with reference to several exemplary embodiments and the accompanying drawings, in which:

FIG. 1 shows a partial and schematic front view of a floor-watering system,

FIG. 2 shows a front sectional view of a shut-off member,

FIG. 3 shows a side view of the shut-off member of FIG. 2,

FIG. 11 shows a partly sectional front view of the 3/2-port directional control valve of FIG. 9 in the flushing position.

DETAILED DESCRIPTION OF THE PREFERRED EMBODIMENTS

Figure 5:
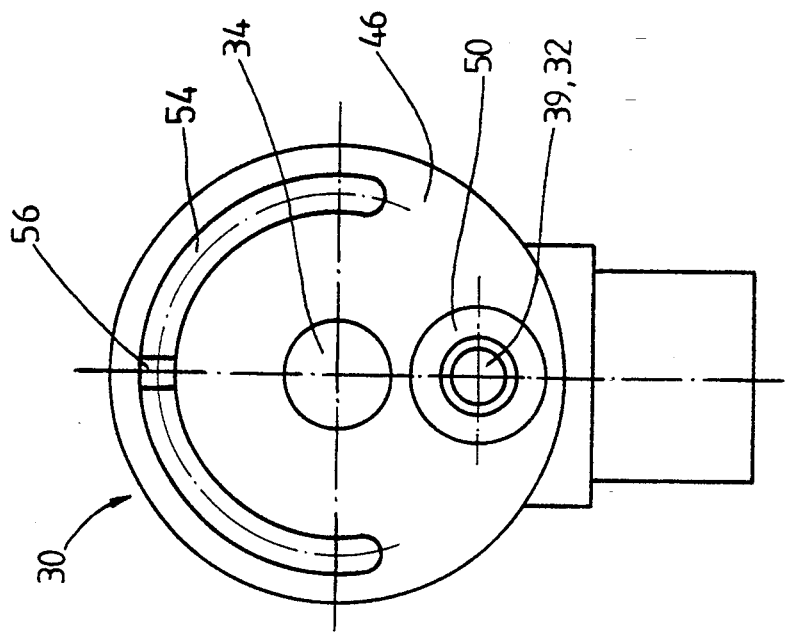
FIG. 5 shows a side view of the half of FIG. 4 in the direction of V.

The floor-watering systems of the type illustrated in the Figures serve for the automatic delivery of water to animals, specifically poultry (e.g. chickens). For this purpose, several floor-watering systems 10 are arranged in a housing. FIG. 1 shows only one of these floor-watering systems 10. The illustrated floor-watering system 10 is comprised of three individual elements 11. Each of these individual elements 11 has a support profile element 12 which holds a water supply line element 13. The water supply line element 13 has several equally spaced drinking points 14. The number of the drinking points 14 and of the individual elements 11 assembled to form the floor-watering system 10 depends on the number, type and stage of growth of the chickens and on the size of the housing.

The support profile elements 12 and the water supply line elements 13 are assembled in the region of coupling points 15 to form a support profile 16 and a water supply line 17, respectively.

The water supply line 17 is suspended from a housing ceiling 64 with essentially equally spaced ropes 18 in the region of the coupling points 15 and at the ends of the floor-watering system 10. The individual ropes 18 are deflected at the housing ceiling 64 by pulleys 65 and are connected to a main rope 19. As a result, the floor-watering system 10 can be moved up and down evenly when the main rope 19 is actuated. This is required, on the one hand, for adapting the height of the floor-watering system 10 to the size or the growth of the chickens and, on the other hand, for removing the floor-watering system 10 from the floor region of the housing and for arranging the system as closely as possible underneath the housing ceiling 64 when the housing is to be cleaned, especially when a new flock of chickens is put into the housing.

The water supply line 17 is supplied with water from a line 20. A pressure reducer 21 is disposed between this line 20 and the water supply line 17. The water supply line 17 is provided at both ends with a T-piece 23, each of which having two connections 24 located opposite one another in the longitudinal direction of the water supply line 17, and a connection 25 which is directed upwardly and perpendicularly to the former connections 24.

One of the two connections 24 of the T-pieces 23 is connected directly to the associated water supply line element 13. The other connection 25 of the T-piece 23 which is shown in FIG. 1 on the left hand side of the floor-watering system 10 is connected to the line 20 via the pressure reducer 21, so that the two connections 24 of this T-piece 23 are always open. The connection 24 of the right hand side T-piece 23 of FIG. 1 which is directed away from the water supply line 17 forms a delimitation of the water supply line 17 and is closed with a plug 26 in the operating position.

Each T-piece 23 is associated with a vent 22. The identically designed vents 22 have a tubular (elongated) venting means 28 which has an upper opening 29 for the escape of air. The vent 22, i.e. the lower end of the venting means 28 thereof, is connected to the connection 25 of the associated T-piece 23 with the aid of a shut-off member 27. The shut-off member 27 can be actuated by way of pivoting the elongated venting means 28. In the operating position of the floor-watering system 10, the venting means 28 extends approximately vertically so that air can escape from the water supply line 17 through the opening 29 from the vent 22. In the flushing position, the venting means 28 is pivoted through approximately 90° into a nearly horizontal position, so that the shut-off member 27 is closed and no air can escape from the openings 29 of the vents 22. In this position of the venting means 28 and the shut-off members 27, the flushing water is introduced under pressure into the water supply line 17 at only one end of the floor-watering system 10 (on the left hand side in FIG. 1) and is discharged from the water supply line 17 at the other end (on the right hand side in FIG. 1). For this purpose, the plug 26 which closes this end of the water supply line 17 in the operating position is removed, and a hose is connected to the open end of the water supply line 17 for draining the flushing water. Additionally, the pressure reducer 21 is bypassed with a bypass 66 (FIG. 12) for flushing the watering system.

The shut-off members 27 (FIGS. 2 to 7) have two halves 30, 31 which can be moved relative to one another selectively. Consequently, the shut-off members 27 are actuated by pivoting the halves 30, 31 relative to one another, so that either a port 32 for venting the water supply line is open in the operating position or the port 32 is closed so that neither air nor flushing water can escape from the floor-watering system 10 via the shut-off members 27.

One of the halves 30 of the shut-off member 27 is firmly joined to the water supply line 17, whereas the other half 31 is firmly joined to the venting means 28. The two halves 30, 31 are connected to one another by a common axis 33 and are rotatable relative to one another about the axis 33. Because the venting means 28 is firmly joined to the half 31, the shut-off means 27 is actuated only by an appropriate pivoting of the venting means 28. To arrange the floor-watering system 10 closely underneath the housing ceiling 64 when a new flock of small animals is put in the housing, the venting means 28 has to be pivoted into an essentially horizontal plane and, after the downward movement into the operating position, back into the vertical position anyway. As a result, no additional measures for changing from a flushing position into an operating position and vice versa are required. But even if the floor-watering system is to be flushed without having to be moved upwards, the vents 22 can be opened and reclosed very easily in the manner described above.

The half 30 has a bore 34 and the half 31 a journal 35 which are designed correspondingly and cooperate in such a way that a defined pivoting movement of the halves 30, 31 about the common axis 33 is always ensured.

The port 32 of the shut-off member 27 is formed from an opening section 36, 37 of each half 30, 31. The opening section 36 has two part sections 38, 39 which are disposed essentially perpendicularly, and the opening section 37 has two part sections 40, 41 disposed essentially perpendicularly.

The part section 38 opens out into a recess 42 of a connecting piece 43. The shut-off member 27 is firmly joined to the connection 25 of the T-piece 23 and thereby to the water supply line 17 with the aid of the connecting piece 43. The part section 41, on the other hand, opens out into a recess 44 of a receiving portion 45 which holds the venting means 28. In the operating position of the shut-off member 27, i.e. when the port 32 is open (FIGS. 2, 3), the water supply line 17 is connected to the venting means 28 via the port 32, so that air can escape from the water supply line 17 through the shut-off member 27 and the vent 22. In the operating position, the part sections 39, 40 extend essentially coaxially relative to one another and overlap at least partially in the region of common contact surfaces 46, 47. In this position, the venting means 28 is located and held in an essentially vertical position by means of a pivoting movement.

If, on the other hand, the half 31 is pivoted relative to the half 30 in one of the two opposed directions with the aid of the venting means 28, the part sections 39, 40 do not overlap and the port 32 of the shut-off member 27 is closed. In this relative position, the halves 30, 31 are located in the flushing position of the floor-watering system 10.

Figure 4:
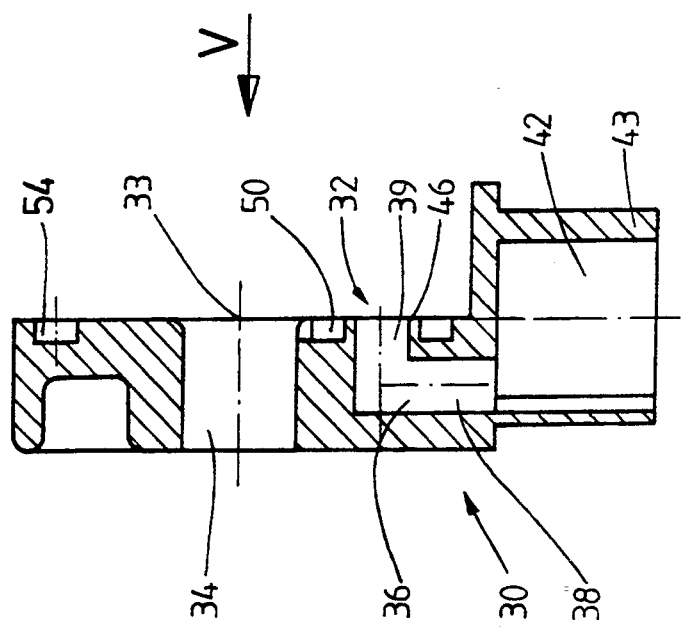
FIG. 4 shows a sectional front view of a half of the shut-off member.
Figure 7:
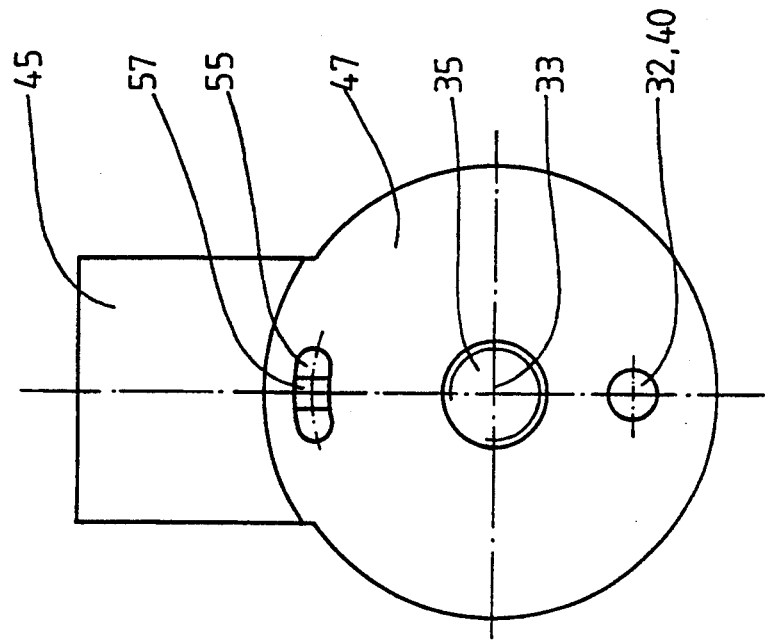
FIG. 7 shows a side view of the half of FIG. 6.
Figure 6:
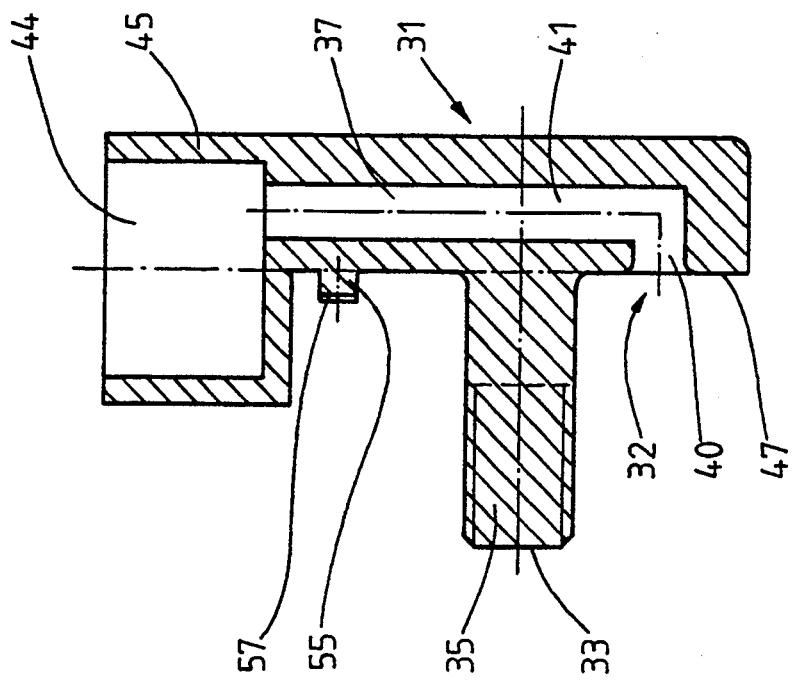
FIG. 6 shows a sectional front view of another half of the shut-off member.

A sealing arrangement 48 is disposed between the halves 30, 31 and prevents an exit of water from between the halves 30, 31. This sealing arrangement comprises a sealing ring 49 in the form of an O-ring and a groove 50 with a rectangular cross section for receiving the sealing ring 49. The groove 50 extends in a circular fashion in the contact surface 46 of the half 30 and is disposed coaxially and at a small distance relative to the part section 39, i.e. the groove 50 surrounds the part section 39 (FIGS. 4, 5). The sealing ring 49 is held in the groove 50 and rests against the plane contact surface 47 of the half 31 in such a way that no water can escape from between the halves 46, 47 in any relative position of the halves. The mutual contact of the halves 30, 31 at the contact surfaces 46, 47 and the sealing contact of the sealing ring 49 on the contact surface 47 of the half 31 is also ensured because the journal 35 of the half 31 is retained in the bore 34 of the half 30 by a hexagon nut 51 and a spring washer 52 which connect the halves 30, 31.

The rotation of the halves 30, 31 relative to one another is limited. For this purpose, the shut-off member 27 is provided with a guide 53 which permits a pivoting movement of the venting means 28 from its vertical position, in which the port 32 is open, in both directions up to an essentially horizontal position in which the port 32 is closed. The guide 53 is formed, on the one hand, from a circular arc-shaped guiding groove 54 which extends symmetrically relative to the bore 34 in the upper region of the contact surface 46 of the half 30. And, on the other hand, the guide 53 is formed from a guiding pin 55 which is disposed on the contact surface 47 of the half 31 and is also formed symmetrically relative to the half 31 and correspondingly to the guiding groove 54 in such a way that it is movable in the guiding groove 54 and thus limits the pivoting movement of the half 31 relative to the half 30. The half 31, which carries the venting means 28, can be fixed at either end of the pivoting movement relative to the half 30 when the guiding pin 55 of the half 31 abuts the respective end of the guiding groove 54.

In the position in which the port 32 is open, the half 31 is fixed relative to the half 30 by means of two locking means. One of these locking means is assigned to the guiding groove 54 and the other to the guiding pin 55. The locking means of the guiding groove 54 is a curvature 56 which projects in the center of the guiding groove 54. The locking means of the guiding pin 55 is a retaining groove 57 in the surface of the guiding pin 55. The retaining groove 57 and the curvature 56 are designed to correspond to one another in such a way that the retaining groove 57 can be held in a sufficiently firm manner over the curvature 56 for fixing the half 31 relative to the half 30 in order to secure the venting means 28 in the operating position.

As already described in the foregoing, the connection 25 of the right hand side T-piece 23 of FIG. 1 which is directed away from the floor-watering system 10 must be closed in the operating position of the floor-watering system 10 by the plug 26. During flushing, this connection 25 is open and the draining line for the flushing water is connected thereto. According to a further exemplary embodiment of the invention, the end of the floor-watering system 10 which is illustrated on the right in FIG. 1 is for this purpose associated directly with a directional control valve 58. This directional control valve is connected directly to the water supply line 10 without the T-piece 23 and can be actuated with the aid of the venting means 28 which is pivotably connected to the directional control valve 58.

Figure 8:
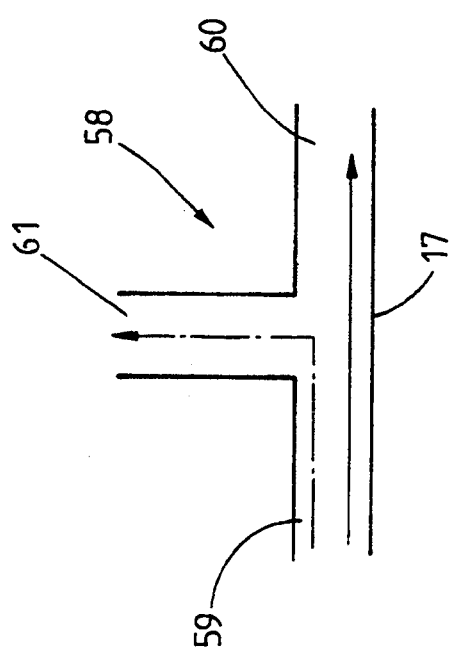
FIG. 8 shows a schematic view of a 3/2-port directional control valve of the floor-watering system.

The directional control valve 58 which is illustrated schematically in FIG. 8 is a 3/2-port directional control valve. This valve has two valve connections 59, 60 for the water supply line 17 and a valve connection 61 for the vent 22 or the venting means 28. The directional control valve 58 is operated with the aid of the venting means 28 in such a way that the connections 59, 61 are open and the connection 60 is closed in the operating position, so that the end of the water supply line 17 is tight, whilst air can escape through the connection 61 to the venting means 28. In FIG. 8, the air flow in the operating position is indicated by a dot-dash line. In the flushing position of the directional control valve 58, the connection 61 is closed and the connections 59, 60 are open. Now, flushing water can flow through the directional control valve 58 via the valve connections 59, 60 and exit from the (right) end of the water supply line 17, as it is indicated in FIG. 8 by the arrow drawn in a solid line.

Figure 9:
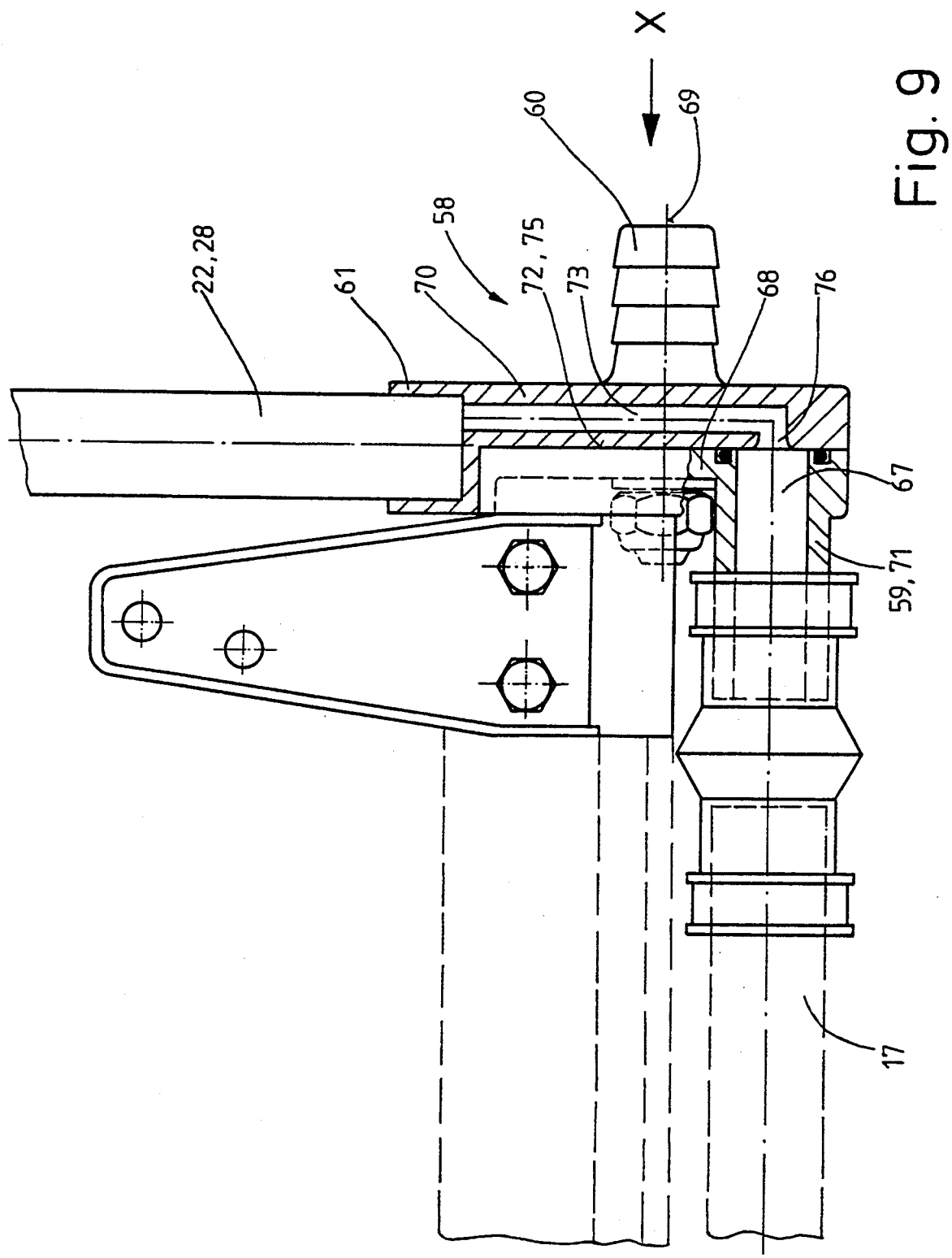
FIG. 9 shows a front view of the 3/2-port directional control valve of FIG. 8 in the venting position.
Figure 10:
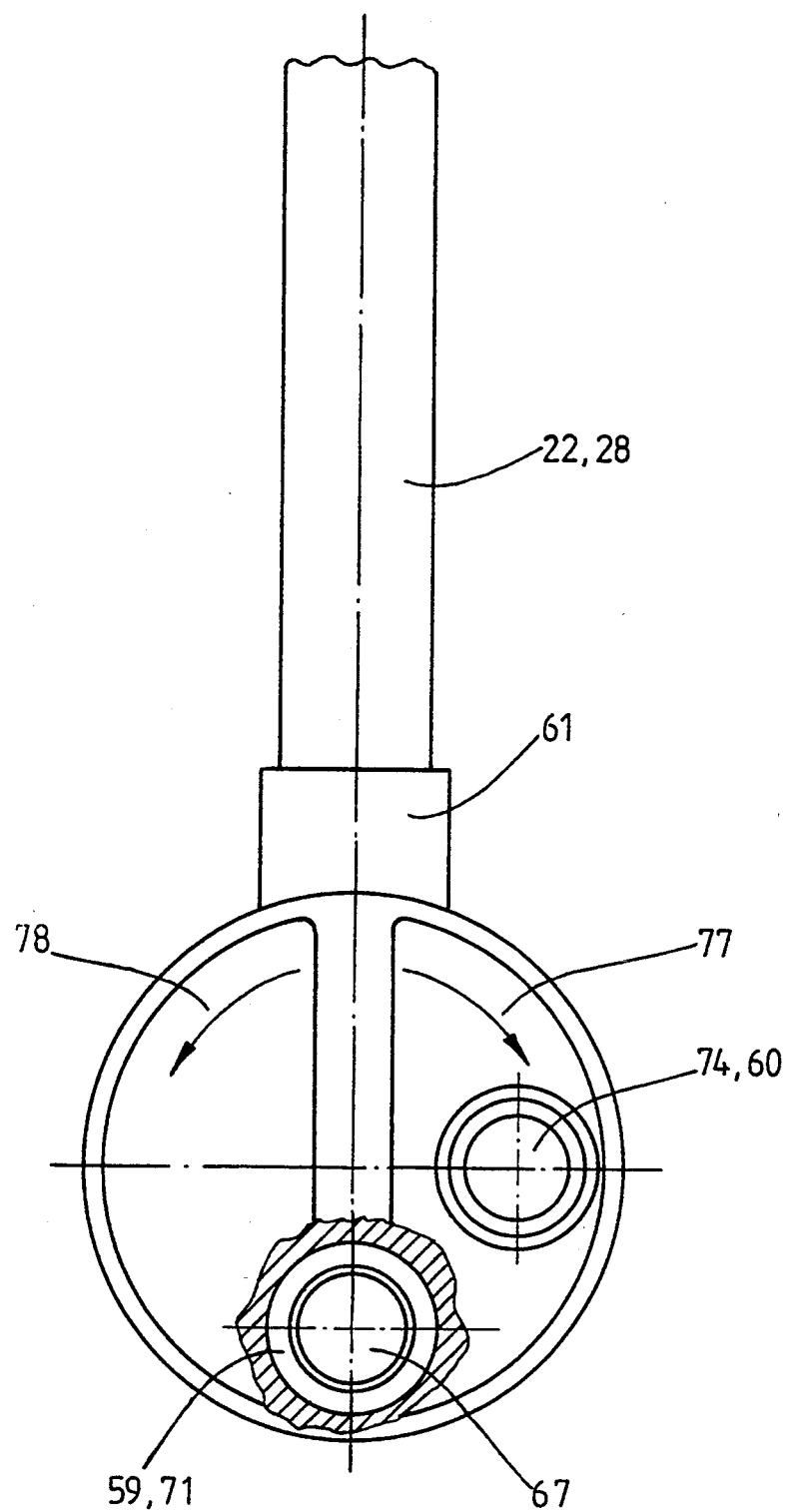
FIG. 10 shows a partly sectional view along the line X—X of the 3/2-port directional control valve of FIG. 9.

The directional control valve 58 illustrated in FIGS. 9 to 11 has—similar to the shut-off member 27—two halves 68 and 70 which are movable relative to one another. An opening section 67 of the half 68 of the directional control valve 58 extends parallel to and at a distance from a pivoting axis 69 about which the other half 70 is pivotable relative to the half 68. The opening section 67 extends the water supply line 17 within a connecting piece 71 up to a contact surface 72. The opening section 67 opens out into an opening section 73 of the half 70 when the directional control valve 58 is located in the venting position (FIGS. 9 and 10). The opening section 73 and the opening section 37 of the half 31 of the shut-off member 27 are essentially identical and the half 70 is associated with the venting means 28 in the same manner.

The half 70 has a second opening section 74 in the form of a through bore which also extends parallel to the pivoting axis 69. This through bore extends from a contact surface 75 of the half 70 to the valve connection 60 at the other side of the half 70. The distance between the opening section 74 and the axis 69 is the same as the distance between the opening section 67 of the half 68 and the axis 69, but the opening section 74 is offset by about 90° relative to a part section 76 of the opening section 73 which is also parallel to the pivoting axis 69. It is possible to fix essentially three different positions with the directional control valve 58. The pivoting of the halves 68, 70 relative to one another, the sealing in the region of the contact surfaces 72, 75 and the delimitation of the pivoting movement and the fixing of the halves 68, 70 relative to one another can take place in the same way as with the shut-off member 27.

In the venting position illustrated in FIGS. 9 and 10, in which the opening section 67 of the half 68 and the part section 76 of the opening section 73 of the half 70 essentially cover one another, the water supply line 17 is connected to the venting means 28 in such a way that air can escape from the water supply line 17 through the opening sections 67 and 73. In this case, the opening section 74 is closed.

When the half 70 is pivoted with the aid of the venting means 28 from the venting position of the directional control valve 58 through approximately 90° in the direction indicated by arrow 77 (FIG. 10) relative to the half 68, the directional control valve 58 assumes the flushing position illustrated in FIG. 11, in which the flushing water can pass the directional control valve 58 through the opening sections 67 and 74 and can be discharged via the valve connection 60 in the form of a hose connection and a hose connected thereto. In this case, the opening section 73 which leads to the venting means 28 is closed.

Apart from these two positions, the directional control valve 58 can be moved into a shut-off position in which neither air nor water can pass the directional control valve 58 and escape from the water supply line 17. For this purpose, the half 70 has to be pivoted in the direction indicated by arrow 78 (FIG. 10), such that the opening section 67 contacts the contact surface 75 of the half 70. This position is of particular advantage when the floor-watering system has to be moved up closely underneath the housing ceiling for a change of flocks of small animals and it is not intended to flush the water supply line 17.

It is a particular advantage of the directional control valve 58 that the shut-off and flushing position as well as the operating or venting position can be selected in an extremely simple manner and that the valve connection 60 can be closed in the operating or venting position without the additional plug 26.

According to a further exemplary embodiment of the invention, a directional control valve 62 is disposed down-stream of the pressure reducer 21 in the direction of flow, i.e. on the side of the pressure reducer 21 which is directed away from the line 20. This arrangement is illustrated schematically in FIG. 12. The directional control valve 62 has valve connections 79, 80, and 81. Additionally, the directional control valve 62 has a valve connection 63. The directional control valve 62 thus takes the form of a 4/2-port directional control valve. The directional control valve 62 is also inserted in the water supply line 17 and connected to the venting means 28. The directional control valve 62 can be operated by a pivoting movement of the venting means 28.

The valve connection 63 serves for bypassing the pressure reducer 21 with a bypass 66 in the flushing position of the floor-watering system 10, so that flushing water enters the water supply line 17 through the valve connection 63 under full pressure. Apart from the valve connection 63, the valve connection 80 is also open in the flushing position of the directional control valve 62. If required, the valve connection 79 may be open as well. But the valve connection 81 which leads to the venting means 28 is closed. The path of the water in the flushing position of the floor-watering system 10 is indicated by dot-dash lines in FIG. 12.

Figure 12:
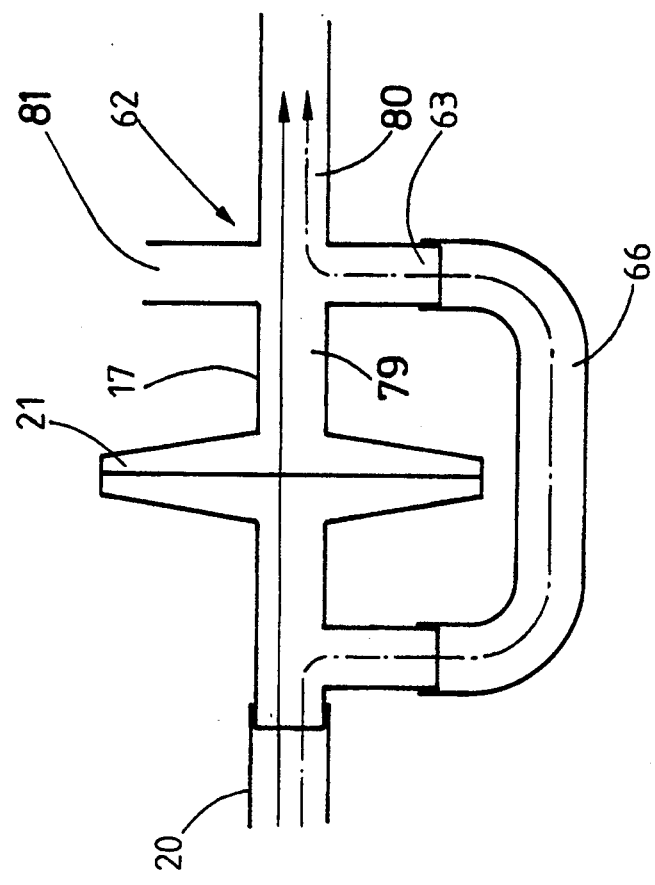
FIG. 12 shows a schematic view of a 4/2-port directional control valve disposed in the region of a pressure reducer of the floor-watering system.

In the operating position of the directional control valve 62, the valve connection 63 is closed. As a result, no water can flow through the bypass 66. Consequently, the water which is fed into the water supply line 17 from the line 20 has to pass the pressure reducer 21. The flow of water in the operating position is indicated in FIG. 12 by a solid line. Furthermore, the valve connection 61 leading to the venting means 28 is open in the operating position, so that air can escape through the vent 22 in order to vent the floor-watering system 10.

In the floor-watering system 10 described in the foregoing, the bypass 66 which bypasses the pressure reducer 21 is always present and is merely shut off by the directional control valve 62 in order to operate the floor-watering system 10 and is opened only for flushing. As a result, this floor-watering system 10 can be changed over from a watering operation to a flushing operation in an extremely simple and uncomplicated fashion.

The directional control valve 62 can be formed from a customary 4/2-port directional control valve. An actuating means of the respective directional control valve 62 is connected to the elongated venting means 28, so that a pivoting of the venting means moves the directional control valve 62 from the operating position into the flushing position. The valve connection 81 of the directional control valve 62 which leads to the vent 22 is connected to the venting means 28 in a suitable manner, for example by means of a short piece of pipe or a short hose in such a way that air can escape from the venting means during the watering operation of the floor-watering system 10 which is thus vented.

I claim:

1. A floor-watering system for feeding water to animals, having a water supply line, several drinking points associated with the water supply line, and at least one venting means for venting the water supply line, the venting means being connected to the water supply line via a shut-off member, and the shut-off member being actuable by a movement of the at least one venting means.

2. The floor-watering system as claimed in claim 1, wherein the shut-off member is disposed between the water supply line and the at least one venting means and is actuable between a closure position for flushing the floor-watering system and an opening position for operating the floor-watering system.

3. The floor-watering system as claimed in claim 1 or 2, wherein the at least one venting means has a rod-like design and a central through opening for the passage of air.

4. The floor-watering system as claimed in claim 1, wherein the shut-off member has a first half and a second half which are movable relative to one another in such a way that a port is closed or open for air or water.

5. The floor-watering system as claimed in claim 4, wherein the first half of the shut-off member is joined to the water supply line (17) and the second half is joined to the at least one venting means.

6. The floor-watering system as claimed in claim 4, wherein the first half and the second half are pivotable relative to one another about a common first axis with the aid of a journal of the second half which is held in a bore located in the first half.

7. The floor-watering system as claimed in claim 4, wherein the port is formed from a first opening section in the first half and a second opening section in the second half of the shut-off member.

8. The floor-watering system as claimed in claim 7, wherein the first opening section and the second opening section each has first and second part sections extending in different directions relative to one another.

9. The floor-watering system as claimed in claim 4, further comprising a sealing means located between the the first half and the second half to inhibit an escape of water from between the first half and the second half.

10. The floor-watering system as claimed in claim 9, wherein the sealing means is a sealing arrangement having a sealing ring which is assigned to one half (30, 31, 68, 70) of the shut-off member located in a groove in the region of a contact surface on the first half and a second contact surface on the second half.

11. The floor-watering system as claimed in claim 10, wherein the sealing ring is held in the groove of the first contact surface of the first half which is joined to the water supply line and sealingly contacts the second contact surface of the second half.

12. The floor-watering system as claimed in claim 10, wherein the sealing ring surrounds the second part section of the first opening section symmetrically and at a small distance therefrom.

13. The floor-watering system as claimed in claim 4, further comprising a guide for delimiting the pivoting movement of the second half which carries the at least one venting means relative to the first half which is joined to the water supply line.

14. The floor-watering system as claimed in claim 13, wherein the guide is formed from a circular arc-shaped guiding groove located on the first half and a corresponding guiding pin on the second half.

15. The floor-watering system as claimed in claim 14, wherein the guiding groove has a first end and a second end and the second half which carries the at least one venting means is fixable by a contact of the guiding pin on one of the ends of the guiding groove.

16. The floor-watering system as claimed in claim 4, further comprising a locking means wherein the first half and the second half are fixable by said locking means in at least one of the flushing position and operating position of the at least one venting means which opens the port.

17. The floor-watering system as claimed in claim 16, wherein the locking means is formed from a holding groove in a surface of the guiding pin and a curvature in the guiding groove, which curvature corresponds to the holding groove.

18. The floor-watering system as claimed in claim 1, wherein the water supply line is associated with the shut-off member for closing or opening the at least one venting means in the flushing position or the operating position.

19. The floor-watering system as claimed in claim 1, wherein the shut-off member is is actuable with the aid of the movement of the at least one venting means, and wherein the at least one venting means is disposed essentially vertically in the operating position.

20. The floor-watering system as claimed in claim 1, wherein the directional control valve has at least two valve connection means for the water supply line and a valve connection means for the at least one venting means, and wherein at least one of the valve connections means for the water supply line is closed in the operating position and the valve connection means for the at least one venting means and one of the valve connections means are open, whilst the valve connection means for the at least one venting means is closed in the flushing position.

21. The floor-watering system as claimed in claim 20, wherein the shut-off member further comprises an additional connection and a bypass connected thereto which bypasses a pressure reducer of the water supply line.

* * * * *